United States Patent
Lepaksha et al.

(10) Patent No.: US 11,836,086 B1
(45) Date of Patent: Dec. 5, 2023

(54) ACCESS OPTIMIZED PARTIAL CACHE COLLAPSE

(71) Applicant: QUALCOMM Incorporated, San Diego, CA (US)

(72) Inventors: Hithesh Hassan Lepaksha, Hyderabad (IN); Sharath Kumar Nagilla, Hyderabad (IN); Darshan Kumar Nandanwar, Bangalore (IN); Nirav Narendra Desai, Hyderabad (IN); Venkata Biswanath Devarasetty, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/806,291

(22) Filed: Jun. 10, 2022

(51) Int. Cl.
*G06F 12/0891* (2016.01)
*G06F 12/123* (2016.01)
*G06F 12/0895* (2016.01)

(52) U.S. Cl.
CPC ...... *G06F 12/0891* (2013.01); *G06F 12/0895* (2013.01); *G06F 12/124* (2013.01)

(58) Field of Classification Search
CPC . G06F 12/0891; G06F 12/0895; G06F 12/124
See application file for complete search history.

(56) References Cited

U.S. PATENT DOCUMENTS

| | | | | |
|---|---|---|---|---|
| 2013/0036270 A1* | 2/2013 | Dreslinski | ........... | G06F 12/0893 711/128 |
| 2014/0136870 A1* | 5/2014 | Breternitz | ............ | G06F 1/3225 713/323 |
| 2015/0039833 A1 | 2/2015 | Chang et al. | | |
| 2015/0185801 A1* | 7/2015 | Arora | .................... | G06F 1/3287 713/320 |
| 2015/0309939 A1 | 10/2015 | Sadoughi-Yarandi et al. | | |
| 2017/0132144 A1* | 5/2017 | Solihin | ............... | G06F 12/0893 |

OTHER PUBLICATIONS

Cheng H-Y., et al., "EECache: A Comprehensive Study on the Architectural Design for Energy-Efficient Last-Level Caches in Chip Multiprocessors", ACM Transactions on Architecture and Code Optimization, Association for Computing Machinery, US, vol. 12, No. 2, Jul. 8, 2015, pp. 1-22, XP058493512, Abstract, p. 17:7, line 25—p. 17:8, line 38, p. 17:13, line 1-line 4, figure 7.
International Search Report and Written Opinion—PCT/US2023/016829—ISA/EPO—dated Jun. 19, 2023.

\* cited by examiner

*Primary Examiner* — Aracelis Ruiz
(74) *Attorney, Agent, or Firm* — Patterson + Sheridan, L.L.P./Qualcomm

(57) ABSTRACT

Aspects of the present disclosure relate to systems and methods for improving performance of a partial cache collapse by a processing device. Certain embodiments provide a method for performing a partial cache collapse procedure, the method including: counting, in each cache way of a group of cache ways, a number of dirty cache lines having dirty bits indicating the cache line has been modified; selecting, from the group, at least one cache way for collapse, based on its corresponding number of dirty cache lines; and performing the partial cache collapse procedure based on the at least one cache way selected from the group for collapse.

23 Claims, 8 Drawing Sheets

US 11,836,086 B1

ACCESS OPTIMIZED PARTIAL CACHE COLLAPSE

BACKGROUND

Field of the Disclosure

Aspects of the present disclosure relate to memory devices, and in particular to systems and methods for improving performance of a partial cache collapse procedure.

Description of Related Art

Generally, a main memory in a computing system may use random access memory (RAM) devices as a volatile memory source. RAMs are particularly useful as memories because of their density and speed. One of the disadvantages is that a RAM may occasionally experience errors due to, for example, by neutron or alpha particle crossing the die, faulty components, inaccurate system timing, etc. This disadvantage may be particularly problematic for computing systems that communicate critical data or data that is required to be virtually error-free.

For this reason, computer systems may include error correction devices which generate and store one or more error correction code (ECC) bits that correspond to data being stored in the RAM. Here, when stored data is read from main memory, the associated ECC bits are also read out and transmitted to an error correction device for appropriate evaluation and, if necessary, error correction. In some RAM devices, ECC bits are stored "in-line" with the corresponding data. In one example, for every 512 bits payload data stored in the RAM device, there is an associated ECC bit stored in same DRAM in another location (address) than payload data.

However, to perform certain memory functions (e.g., partial data writes), the RAM regions storing the data and its corresponding ECC bits must be initialized to matching values. For example, an application or processor may need to perform a process to initialize the RAM regions that store both the data and the ECC bits by writing zeros into the regions. However, such a process may require a relatively large amount of time and power. In one example, this could pose problems for RAM devices that are battery powered. As RAM devices are utilized more, there exists a need for further improvements to such devices.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages.

Certain embodiments provide a method of performing a partial cache collapse procedure. The method generally includes counting, in each cache way of a group of cache ways, a number of dirty cache lines having dirty bits indicating the cache line has been modified; selecting at least one cache way from the group for collapse, based on its corresponding number of cache lines that satisfy the eviction criteria; and performing the partial cache collapse procedure based on the at least one cache way selected from the group for collapse.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
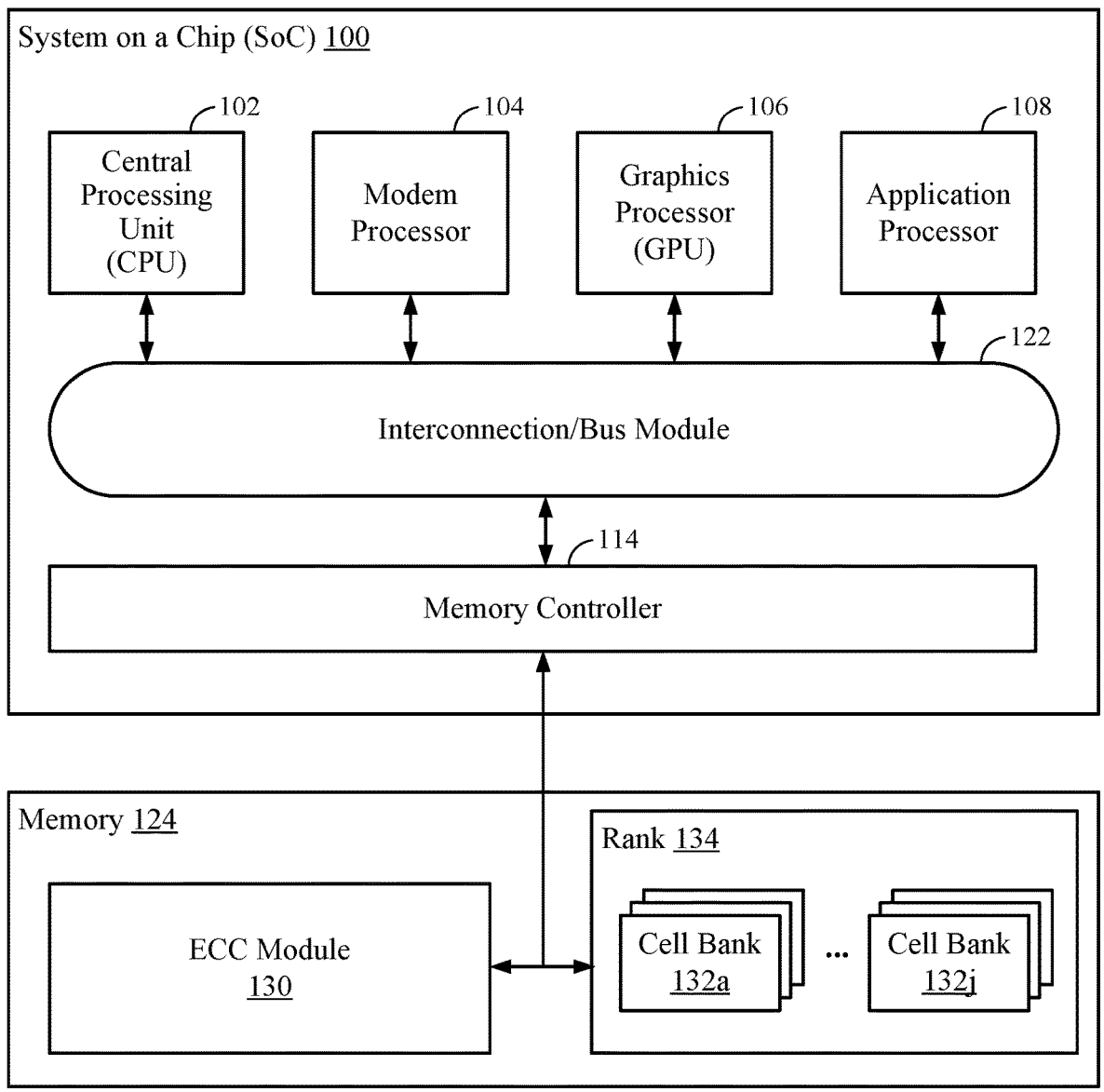
FIG. 1 illustrates example components and interconnections in a system-on-chip (SoC) coupled to a memory suitable for implementing various aspects of the present disclosure.

Aspects of the present disclosure provide methods and apparatuses for improving performance of a partial cache collapse by a processing device.

In a device that performs computer processing (e.g., computers, smartphones, systems-on-chips (SoCs), etc.), cache memory is a supplementary memory system that temporarily stores frequently used instructions and data for quicker processing by a processor (e.g., a central processing unit (CPU)) of the device. Using cache memory may reduce the average time and/or energy used by a processor to access data as compared to the processor accessing data from the main memory of the device. In other words, when data is found in cache memory (in what is referred to as a cache hit), that data is accessed much faster than if that data were to be retrieved from main memory. The number of searches that result in a cache hit, relative to the total number of searches, is referred to as a cache hit ratio.

Some devices may be configured to perform a partial cache collapse, which generally refers a mechanism for saving power by selectively applying power to (power gating) a portion of a shared cache. Advanced reduced instruction set computer (RISC) machine (ARM) architecture-based processors are examples of devices that may perform partial cache collapse procedures. When a device performs a partial cache collapse procedure, the part of the cache being collapsed is typically checked for cache lines in which a dirty bit (i.e., a bit indicating whether the corresponding cache line has been updated) is set. That is, to capture the updated data, each dirty line of a way being collapsed is written to main memory, and the way is collapsed (i.e., the way is power gated).

In conventional partial cache collapse procedures, the selection of the way being collapsed and the writing of the dirty cache lines to main memory proceeds without considering the recentness of the collapsing cache line with respect to other cache ways. Thus, the number of main memory accesses at the time of collapse is generally equal to the number of dirty lines in the collapsing way, without consideration to the eviction policy (a policy applied to decide what cache entries to remove and what to keep). Unfortunately, this typically leads to an increase in the number of memory accesses, a potential increase in cache miss rate, and a loss of performance.

Aspects of the present disclosure, however, provide techniques that may lead to an improved partial cache collapse procedure. For example, by considering the recentness of the collapsing cache line with respect to other cache ways, the number of memory accesses may be reduced and cache miss rate may be reduced, thereby resulting in a corresponding increase in performance.

Overview of Memory System

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Although certain teachings of this disclosure are illustrated in terms of a dynamic random access memory (DRAM) device as an example memory device, the teachings are applicable in other areas, such as to other volatile memory devices (e.g., static RAM (SRAM), synchronous SRAM (SDRAM), Rambus DRAM (RDRAM), etc.). Further, although certain teachings of this disclosure are illustrated in terms of a system-on-chip (SoC), the teachings are applicable to any suitable computing device utilizing a memory. Thus, the teachings disclosed should not be construed to be limited to DRAM devices or SoCs or the illustrated embodiments. The illustrated embodiments are merely vehicles to describe and illustrate examples of the inventive teachings disclosed herein.

FIG. 1 illustrates example components and interconnections in a system-on-chip (SoC) 100 coupled to a volatile memory 124 (e.g., DRAM) suitable for implementing various aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The processors 102, 104, 106, 108 may be interconnected to a memory controller 114 and other system components (not shown) via an interconnection/bus module 122, which may include an array of reconfigurable logic gates and/or implement a bus architecture (e.g., CoreConnect, advanced microcontroller bus architecture (AMBA), etc.). Communications may also be provided by advanced interconnects, such as high performance networks on a chip (NoCs).

The memory controller 114 may include a specialized hardware module configured to receive various memory transactions from one or more masters, and address and communicate the memory transactions to the memory 124. The multiple masters may include one or more of the processors 102, 104, 106, 108, and/or applications operating on the processors 102, 104, 106, 108. The memory controller 114 may also manage maintenance of the memory 124, such as scheduling and/or initiating refresh cycles, and, as described herein, clear content (e.g., data and/or code) commands. In some examples, the memory controller 114 may include one or more processors configured to perform the operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The memory 124 and memory controller 114 may be an on-chip component (e.g., on the substrate, die, integrated chip, etc.) of the SoC 100; however, it should be noted that in some examples, one or more of the memory 124 and memory controller 114 may be located off-chip.

The memory 124 is a computer-readable storage medium having an interface to the processors 102, 104, 106, 108 via the bus module 122. As discussed, memory 124 may be an on-chip component, or alternatively (as shown) an off-chip component. The memory 124 may provide volatile storage, such as DRAM, for the processors 102, 104, 106, 108 and/or other functional aspects of the SoC 100. As shown the memory controller 114 includes an ECC module 130. The ECC module 130 is configured to implement an ECC logic for detecting and correcting errors in the memory 124 as discussed and known in the art. In certain aspects, the ECC module 130 is configured for performing in-line ECC logic.

The memory 124 may also include a hierarchy of one or more ranks 134 and a plurality of banks 132a-132j (collectively referred to as banks 132) in each rank 134. For example, the memory 124 may include a plurality of ranks, wherein each rank contains a plurality of internal bank structures. In some examples, each bank structure may include a plurality of memory pages, or "rows." Generally, one row of memory can be accessed on each bank at a given time. Each of the banks 132 of a given rank 134 may share a bus (not shown) for reading/writing data. Memory controller 114 can support simultaneous operation of different ranks 134 and banks 132, which can be accessed independently. Because each bank 132 acts as an independent entity, the banks 132 can serve multiple memory requests in parallel, offering bank-level parallelism.

Overview of Cache Architecture with Partial Cache Collapse

Figure 2:
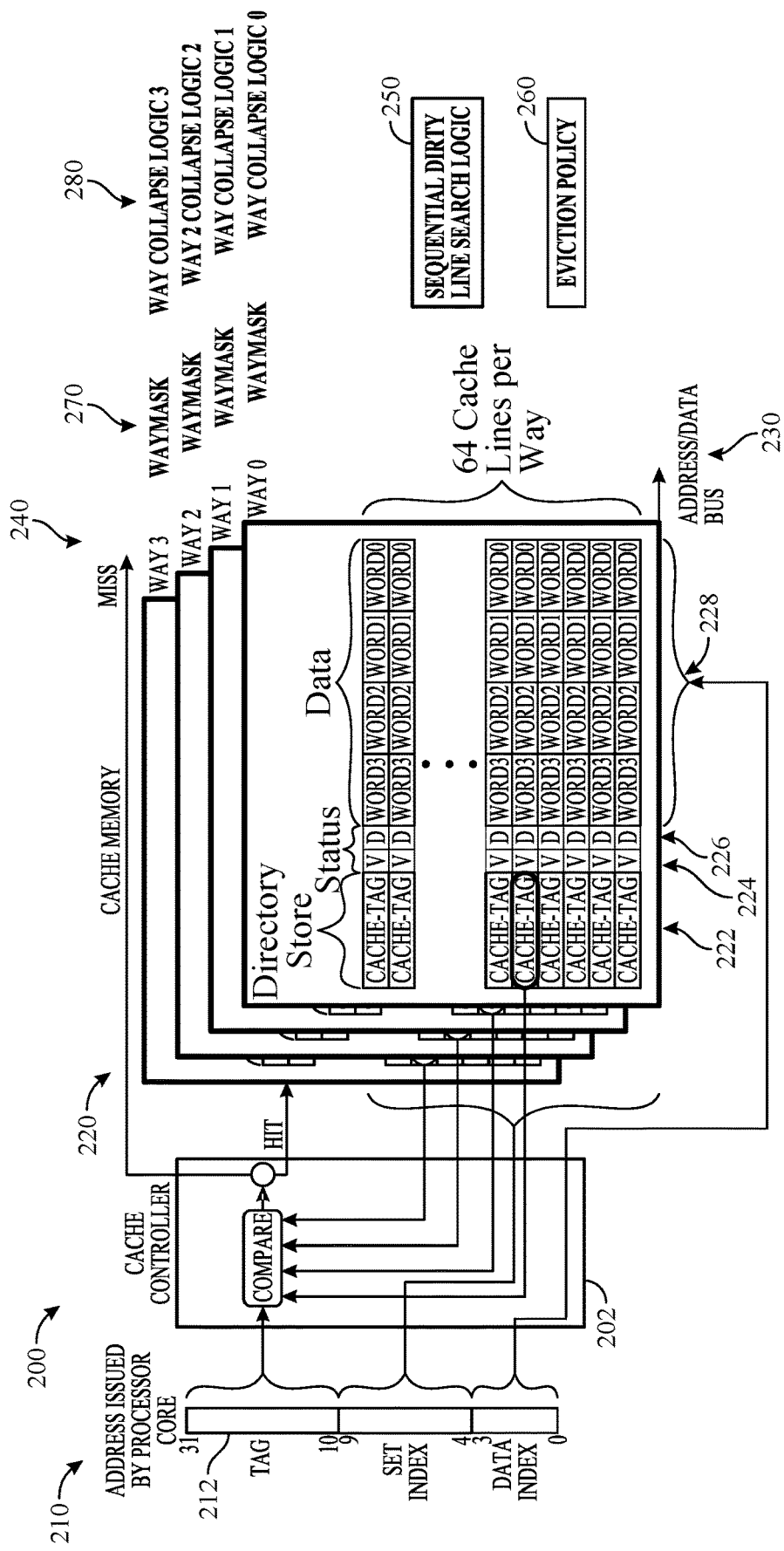
FIG. 2 is a schematic illustrating a partial cache collapse in an example cache, according to aspects of the present disclosure.

FIG. 2 is a schematic illustrating an example cache architecture 200 that may be configured with a conventional partial cache collapse procedure. The cache architecture 200 may be included in the memory controller 114 of SoC 100 or may be built into any of CPU 102, modem processor 104, GPU 106, or application processor 108, all shown in FIG. 1. The cache 200 includes a cache controller 202 and cache memory 220. The cache memory 220 stores cache lines, with each cache line including a cache-tag (shown at 222), a validity bit (shown at 224), a dirty bit (shown at 226), and data (shown at 228). The cache-tag in each cache line indicates which memory location in main memory from which that cache line was copied. The validity bit indicates whether or not the cache line has been loaded with valid data.

During operation of the cache, a processor core (e.g., any of CPU 102, modem processor 104, GPU 106, or application processor 108) issues a memory address 210 of memory that the processor core needs to access for reading or writing. In the example cache, the cache controller compares a tag portion 212 of the memory address with the cache-tags (shown at 222) of the cache lines stored in the cache memory. If the cache controller finds that the tag portion matches a cache-tag in the cache memory, a cache hit has occurred. However, if the cache controller does not find a cache-tag in the cache memory that matches the tag portion, a cache miss has occurred. In the case of a cache hit, the cache controller immediately either reads or writes the data of the corresponding cache line. In the case that the processor core issued a read for the memory location, the cache controller delivers the data of the corresponding cache line to the processor core via the data bus 230. For the case of a cache miss, the cache controller allocates a new cache line in the cache memory and copies data from main memory into the new cache line, then the request from the processor core is fulfilled from the contents of the new cache line.

The example cache is a four-way cache, and thus each main memory location corresponds to one location in each of the four ways 240, and the data of any particular main memory location may be stored in the corresponding location in each of the four ways. Each of the four cache memory locations (i.e., one cache memory location in each way) in which a main memory location's data may be stored may be referred to as being a member of a set of cache memory locations, and each such set has a corresponding set index. Each way has a corresponding way mask 270. When a cache miss occurs, the cache controller attempts to allocate a new cache line in a location in the cache memory that is not in current use. Thus, in the example four-way cache, when the cache controller is allocating a new cache line, the cache controller checks up to four locations (one in each way) to determine if any are unused. If there are no unused locations, then the cache controller consults the eviction policy 260 to determine which of the four locations can have its current data evicted so that the new cache line can be allocated.

When the device containing the example cache determines to perform a partial cache collapse, one of the four ways is selected to be power gated. The cache controller executes the corresponding way collapse logic (shown at 280) in collapsing the selected way. Each of the way collapse logics include executing the sequential dirty line search logic 250, which searches through the selected way for cache lines that are marked dirty (i.e., cache lines for which the dirty bit 226 is set) and writes those cache lines to their corresponding main memory locations, which are known from the cache-tags of the cache lines.

As previously described, in conventional partial cache collapse procedures, the selection of the way being collapsed and the writing of the dirty cache lines to main memory proceeds without considering the recentness of the collapsing cache line with respect to other cache ways. Thus, the number of main memory accesses at the time of collapse is generally equal to the number of dirty lines in the collapsing way, without consideration to the eviction policy (a policy applied to decide what cache entries to remove and what to keep). Unfortunately, this typically leads to an increase in the number of memory accesses, a potential increase in cache miss rate, and a loss of performance.

Example Techniques for an Access Optimized Partial Cache Collapse

Aspects of the present disclosure, however, provide techniques that may lead to an improved partial cache collapse procedure. For example, by considering the recentness of the collapsing cache line with respect to other cache ways.

The partial collapse mechanisms described herein may help optimize a partial cache collapse procedure for performance by reducing the number of memory accesses and cache miss rate, thereby resulting in a corresponding increase in performance.

Figure 3A:
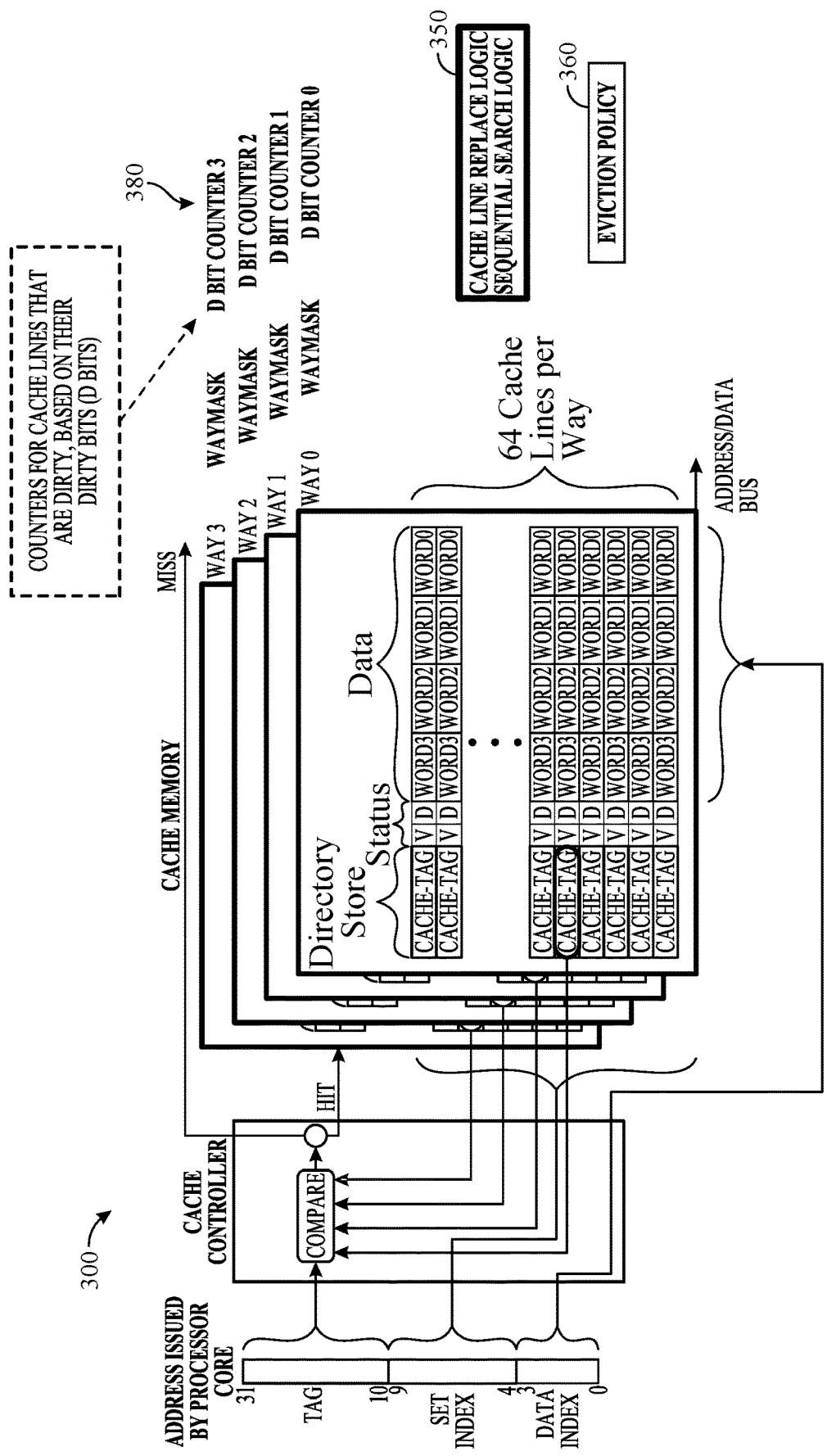
FIGS. 3A and 3B illustrate an example schematic capable of performance aware partial cache collapse procedure, according to aspects of the present disclosure.

The operations performed during the performance aware partial cache collapse procedure proposed herein may be referred to herein as sequential WAY processing. As illustrated in FIG. 3A, a cache architecture 300 configured to perform the access optimized partial cache collapse procedure proposed herein may include cache line replacement logic 350 that includes sequential search logic, details of which are described below.

This sequential WAY processing may be initiated upon fulfillment of certain collapse criteria. If such collapse criteria are not met, the cache may behave as a conventional cache (e.g., without sequential WAY processing logic). Depending on the particular implementation, the collapse criteria may be based on a number of active cores or based on a dedicated request for partial cache collapse by the core or software.

If the collapse criteria is met, the sequential WAY processing logic and additional hardware (e.g., logic 350 of FIG. 3A) may activate and implement the chosen collapsing policy.

In some cases, the cache architecture 300 may include logic 380 configured to count a number of dirty cache lines. As illustrated, dirty cache lines may be indicated by dirty status bits that, when set, indicate the cache line has been modified. As illustrated, the logic 380 may include a "dirty bit" counter, for each way, to count a number of dirty cache lines for a given way. In some cases, similar counters may be used to count cache lines that satisfy other criteria, such as least recently used (LRU). In such cases, these other counters (e.g., LRU counters) may be used in combination with dirty bit counters to decide the best WAY to collapse.

The techniques described herein may be applied in memory systems, regardless of the actual cache eviction policy 360 in each cache way of a group of cache ways. Any suitable deterministic cache eviction policy may be used. For example, the deterministic cache eviction policy may dictate that least recently used (LRU) or least frequently used (LFU) cache lines are evicted.

The cache controller may then select at least one cache way from the group for collapse, based on its corresponding number of cache lines that satisfy the eviction criteria (and perform the partial cache collapse procedure based on the at least one cache way selected from the group for collapse).

Figure 3B:
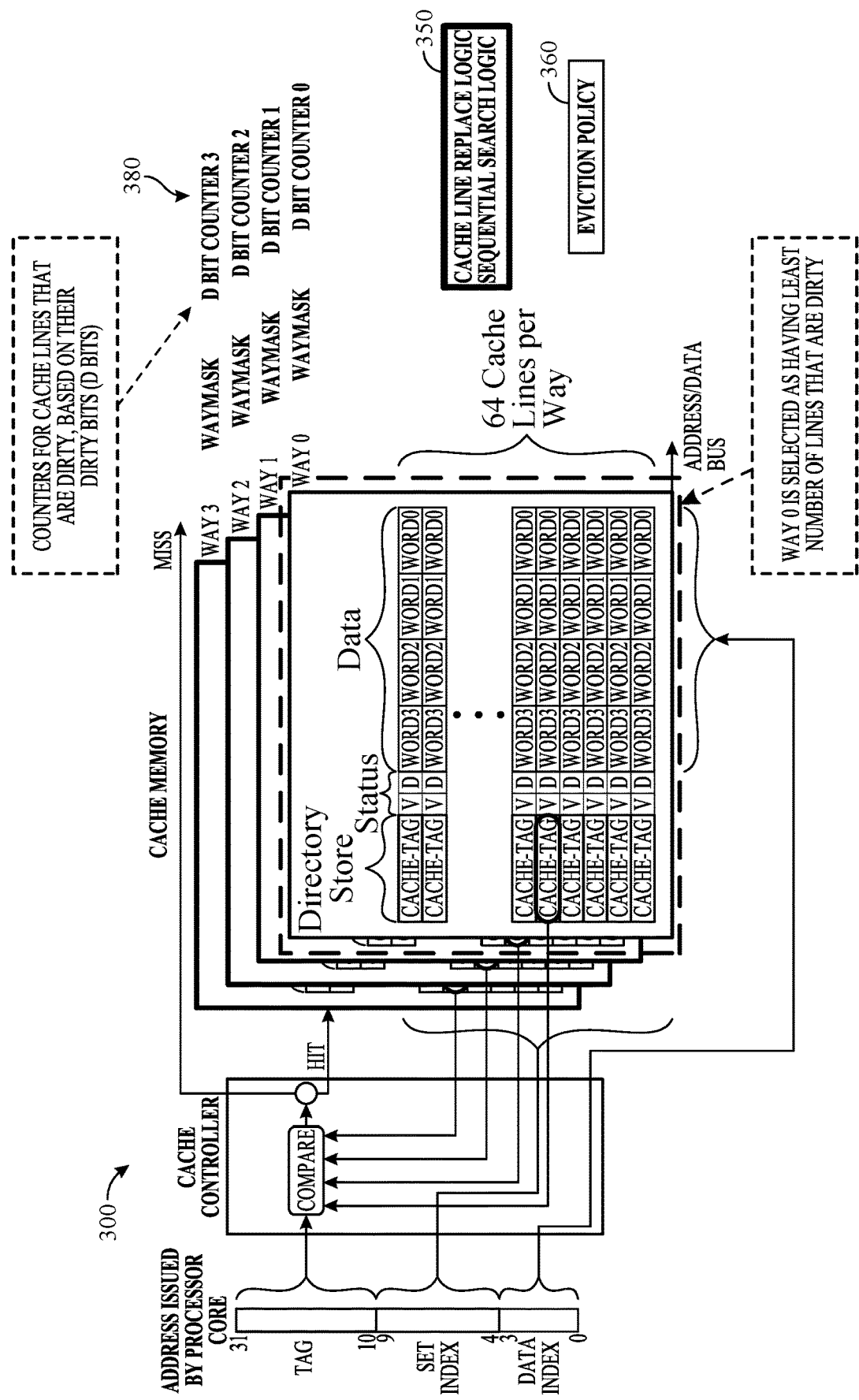

In the example shown in FIG. 3B, Way 0 is selected for collapse, for example, because it has the least number of dirty cache lines. As noted above, in some cases, other factors may be considered in combination with the number of dirty cache lines such as the number of LRU cache lines in a given way. In some cases, if there is a tie in number of dirty cache lines, such other counters may be used to break such a tie and determine which WAY to select for collapse.

The logic 350 may then sequentially check the chosen collapsing cache way (or ways) for cache lines that have a dirty bit set or for most recently used (MRU) cache lines, indicating such cache lines are temporally important (and have been recently accessed and/or modified). Once such a cache line is found, it may be retained by swapping it out with a non-dirty and/or non-MRU cache line from a non-collapsing WAY in the same set. In other words, the non-dirty and/or non-MRU line from the non-collapsing WAY may be evicted and replaced by the dirty and/or MRU cache line from the collapsing way.

This approach may reduce the number of times a memory (e.g., DDR) write is performed during a partial cache collapse, hence decreasing the time taken for WAY collapse preparation and may, also increase the cache hit ratio by retaining temporally important cache lines, as recentness is considered.

Figure 4A:
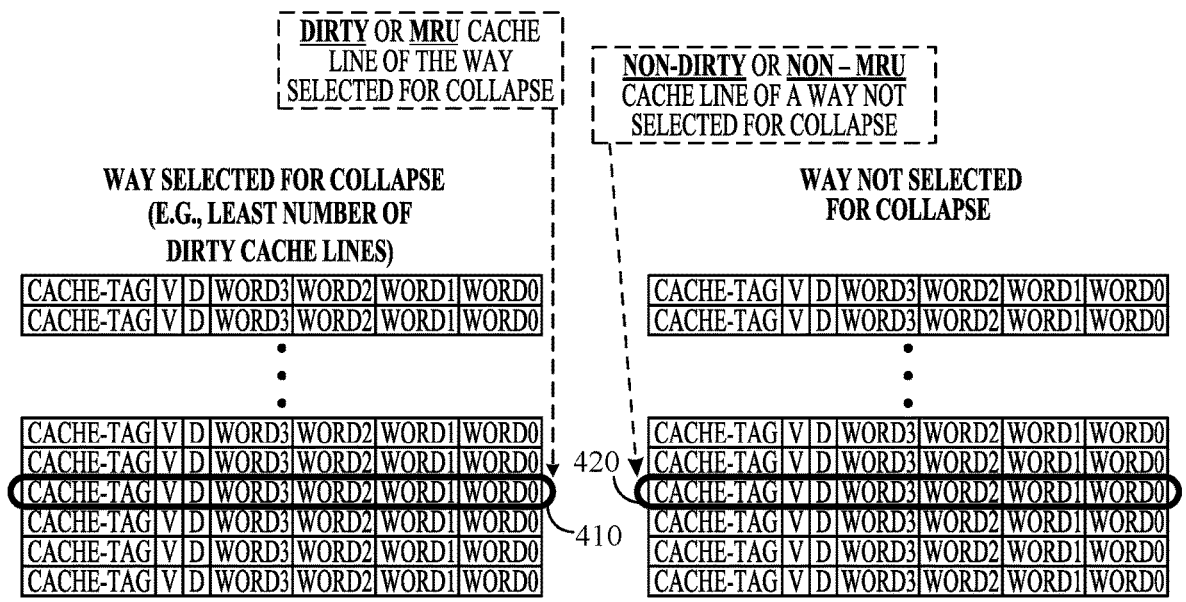
FIGS. 4A and 4B illustrate allocating non-eviction-criteria-satisfying cache lines from a selected way to a non-selected way, according to aspects of the present disclosure.
Figure 4B:
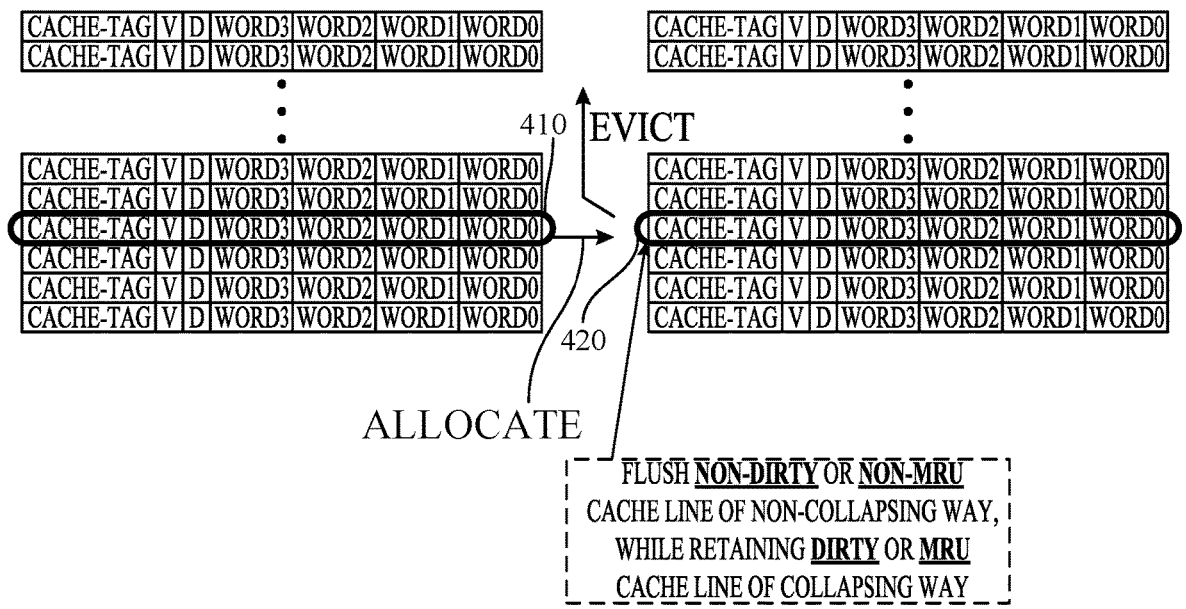

This approach may be understood with reference to FIGS. 4A and 4B. As illustrated in FIG. 4A, the way selected for collapse (e.g., Way 0 from FIG. 3B) may have one or more dirty and/or MRU cache lines 410 (meaning they have been modified and/or accessed relatively recently), while a way that was not selected for collapse may have one or more non-dirty and/or non-MRU cache lines 420 (meaning they have not been changed or accessed relatively recently).

As illustrated in FIG. 4B, the non-dirty/non-MRU cache line(s) 420 from the non-collapsing way may be evicted and replaced by dirty/MRU cache line(s) 410 from the collapsing way. In other words, the evicted non-dirty/non-MRU cache line(s) 420 from the non-collapsing way is allocated for the dirty/MRU cache line(s) 410 from the collapsing way. As noted above, this approach may reduce the number of memory accesses and decrease cache miss rate by retaining temporally important cache lines.

While the example above considered collapse of a single way, in some cases, there may be a need (or desire) to collapse more than one way (e.g., N ways). In such cases, the techniques described above may be performed to select N ways that have the lease dirty cache lines and these may be excluded from swapping operations from the first WAY collapse.

The performance aware partial collapse procedure described herein may have a number of benefits. For example, selecting a way (or ways) with the least dirty cache lines for collapse may reduce the number of immediate memory (e.g., DDR) transactions during collapse. The collapse policy to evict an available non-DIRTY cache line from active WAYS, instead of a DIRTY line from a collapsing WAY may avoid immediate transactions. The collapse policy to retain the MRU lines (or at least temporally important cache lines) according to cache eviction policy implemented, may help reduce the potential DDR transaction by increasing the cache HIT ratio.

Figure 5:
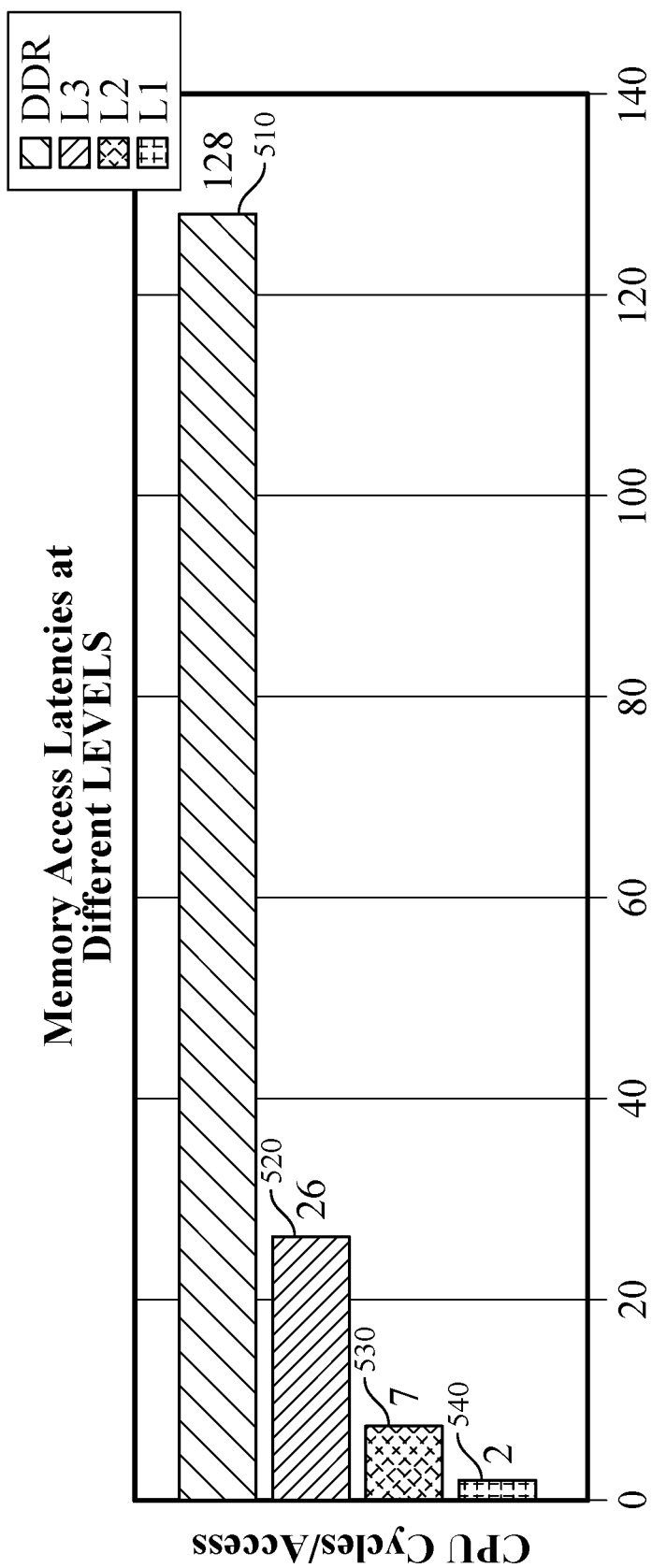
FIG. 5 is a graph of memory access latencies of various levels of memory.

The potential performance improvements may be appreciated considering the example memory access latencies for different memory levels. For example, as illustrated in FIG. 5 latency of a memory access to DDR memory (510) may average 128 CPU cycles per each memory access, latency of memory access to a level 3 (L3) cache (520) may be 26 CPU cycles per each memory access, latency of memory access to a level 2 (L2) cache (530) may be 7 CPU cycles per memory access, while latency of memory access to a level 1 (L1) cache (540) may be 2 CPU cycles per memory access. Given these example values, increasing the cache HIT ratio using the performance aware partial collapse procedure described herein may help avoid the potential ~5× time penalty of DDR access during collapse.

Performing the sequential processing for the performance aware partial collapse procedure described herein may take some amount of time, for example, to complete the replacement (swapping) described with reference to FIGS. 4A and 4B. In some cases, if a read or write request (to L3) arrives during this time, the sequential processing may be halted until the request is serviced.

Aspects of the present disclosure may help reduce power consumption by reducing memory access activity, particularly in high data traffic use cases, such as audio/video playback. Minimizing DDR traffic, as described herein, may help realize partial cache collapse power savings. The power savings may be sensitive to the pattern of addresses accessed. In an Ideal situation, the partial collapse procedure may be sped up, reducing immediate and potential DDR traffic, by increasing the cache HIT ratio, resulting in power savings.

In some cases, all ways (including a way under consideration for collapsing) may remain visible for reads. If the read request is for an already processed index and results in a cache hit on a cache line in one of the ways not selected for the partial collapse, there may be no need to process the index. On the other hand, if the read request hits the collapsing way, the index may be re-processed.

In some cases, at a write request arrival, sequential processing may be halted. The write request may, thus, essentially sees the L3 cache with only non-collapsing ways active. In other words, the way under consideration for collapsing may not be visible for writes. If writing to an already processed index, as the write request evicts one of the non-collapsing ways, the evicted line can be written back to DDR (if Dirty) or swapped with a collapsing way line (e.g., if the collapsing line is non-dirty depending on what is prioritized). Writing a non-processed index may be treated like a normal L3 write with all ways being visible.

In some cases, a collapsing policy may use information about speculative traffic to initiate the sequential processing with chosen collapsing policy with the help of already existing logics like address pattern detection, random address pattern detectors and Prefetch block address. In such cases, it may be possible to create address access patterns which can keep the sequential processing to stall or repeatedly process the same INDEX. To avoid such locking, timer based sequential processing cancellation may be implemented. As an alternative, a limit on a number of sweeps for sequential processing can be set. In such cases, if the timer expires or sweep limit is met, either the collapse processing may be halted, as this may indicate that traffic is high or the L3 transaction may be halted to complete the collapse processing.

Example Methods

Figure 6:
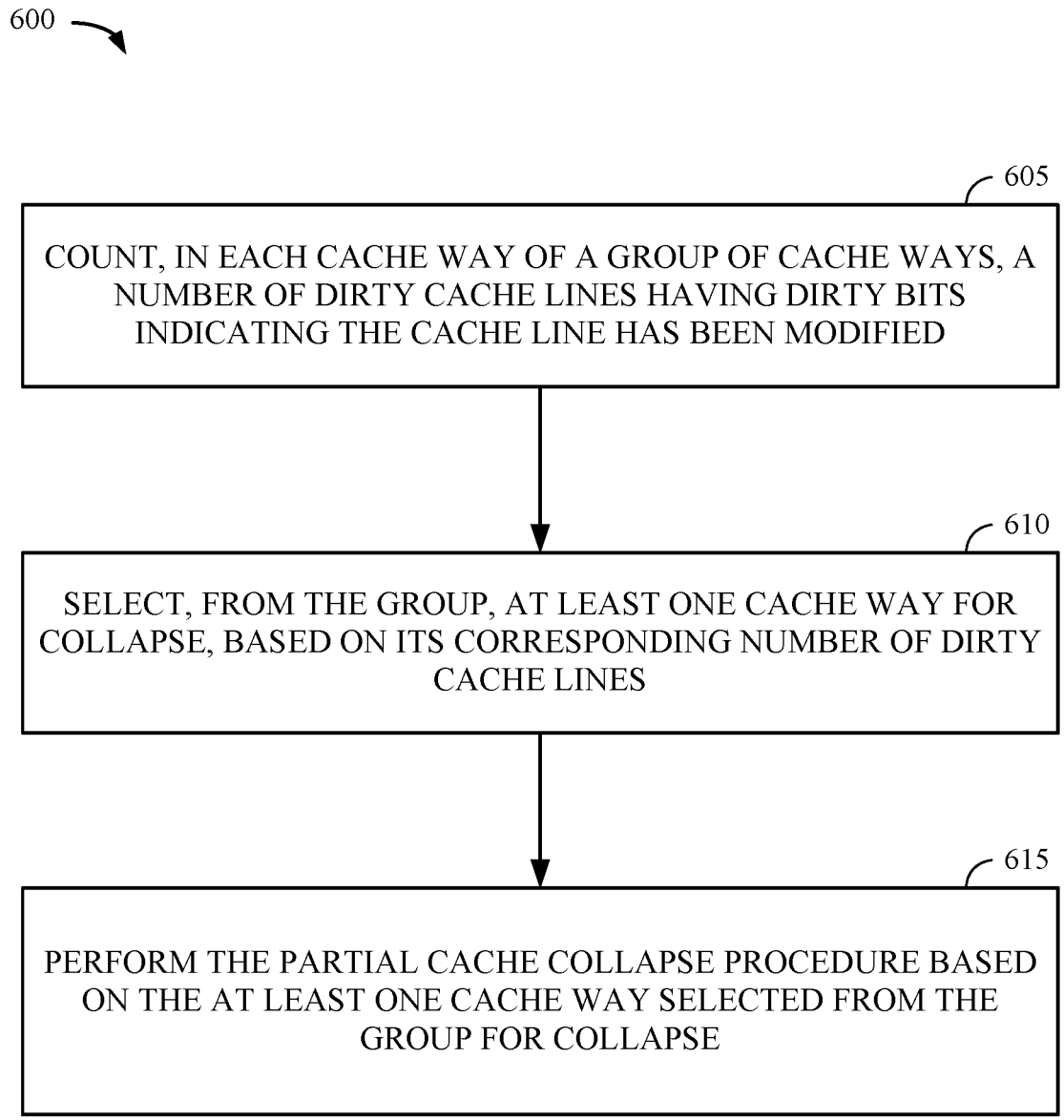
FIG. 6 is a flow chart that illustrates example operations for performing a partial cache collapse procedure, in accordance with aspects of the present disclosure.

FIG. 6 is a flow chart that illustrates example operations 600 for performing a partial cache collapse procedure, in accordance with certain aspects of the present disclosure. For example, the steps of operations of FIG. 6 may be performed by a memory controller (e.g., memory controller 114 of FIG. 1), or another suitable circuit.

The operations 600 begin at step 605 by counting, in each cache way of a group of cache ways, a number of dirty cache lines having dirty bits indicating the cache line has been modified.

The operations 600 may proceed at step 610 by selecting, from the group, at least one cache way for collapse, based on its corresponding number of dirty cache lines.

The operations 600 may proceed at step 615 by performing the partial cache collapse procedure based on the at least one cache way selected from the group for collapse.

In certain aspects, the operations 600 include determining one or more collapse criteria are met prior to performing the partial cache collapse procedure.

In certain aspects, the collapse criteria is based on at least one of a number of active cores or a request for partial cache collapse.

In certain aspects, performing the partial cache collapse procedure includes: replacing a cache line of a cache way, from the group, that was not selected for collapse with a cache line of the cache way that was selected from the group for collapse.

In certain aspects, the replacing includes: evicting the cache line of the cache way that was not selected for collapse; and allocating the evicted cache line to the cache line of the cache way that was selected from the group for collapse.

In certain aspects, the evicted cache line comprises at least one of a non-dirty cache line or a non-most recently used (non-MRU) cache line; and the cache line of the cache way that was selected from the group for collapse comprises at least one of a dirty cache line or a MRU cache line.

In certain aspects, selecting at least one cache way from the group for collapse comprises selecting, for collapse, one cache way having a lowest number of dirty cache lines.

In certain aspects, selecting at least one cache way from the group for collapse comprises selecting multiple cache ways having lowest numbers of dirty cache lines.

In certain aspects, performing the partial collapse procedure comprises excluding cache lines of the multiple cache ways that satisfy the eviction criteria, from replacement operations.

Figure 7:
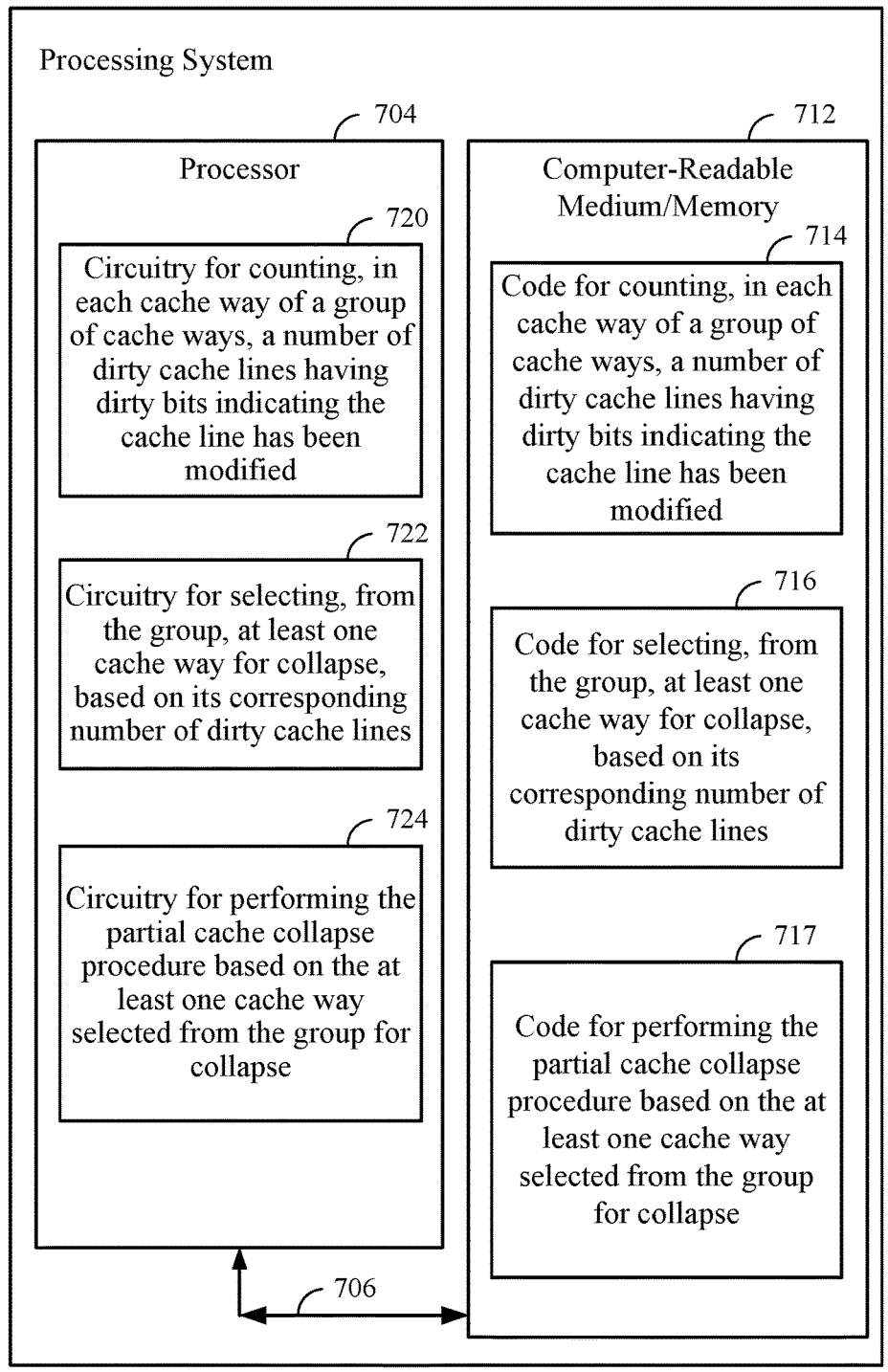
FIG. 7 illustrates a processing system that may include various components (e.g., corresponding to means-plus-function components) configured to perform operations for the techniques disclosed herein.

FIG. 7 illustrates a processing system 700 that may include various components (e.g., corresponding to means-plus-function components) configured to perform operations for the techniques disclosed herein, such as the operations illustrated in FIG. 6. The processing system 700 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 6, or other operations for performing the various techniques discussed herein for performing a partial cache collapse.

In certain aspects, computer-readable medium/memory 712 stores code 714 for counting, in each cache way of a group of cache ways, a number of dirty cache lines having dirty bits indicating the cache line has been modified; code 716 for selecting, from the group, at least one cache way for collapse, based on its corresponding number of dirty cache lines; and code 717 for performing the partial cache collapse procedure based on the at least one cache way selected from the group for collapse.

In certain aspects, the processor 704 has circuitry configured to implement the code stored in the computer-readable medium/memory 712. The processor 704 includes circuitry 720 for counting, in each cache way of a group of cache ways, a number of dirty cache lines having dirty bits indicating the cache line has been modified; circuitry 722 for selecting, from the group, at least one cache way for collapse, based on its corresponding number of dirty cache lines; and circuitry 724 for performing the partial cache collapse procedure based on the at least one cache way selected from the group for collapse.

Example Clauses

Implementation examples are described in the following numbered clauses:

Clause 1: A method for performing a partial cache collapse procedure, comprising: counting, in each cache way of a group of cache ways, a number of dirty cache lines having dirty bits indicating the cache line has been modified; selecting, from the group, at least one cache way for collapse, based on its corresponding number of dirty cache lines; and performing the partial cache collapse procedure based on the at least one cache way selected from the group for collapse.

Clause 2: The method of clause 1, further comprising determining one or more collapse criteria are met prior to performing the partial cache collapse procedure.

Clause 3: The method of clause 2, wherein the collapse criteria is based on at least one of a number of active cores or a request for partial cache collapse.

Clause 4: The method of clause 1, wherein performing the partial cache collapse procedure comprises: replacing a cache line of a cache way, from the group, that was not selected for collapse with a cache line of the cache way that was selected from the group for collapse.

Clause 5: The method of clause 4, wherein the replacing comprises: evicting the cache line of the cache way that was not selected for collapse; and allocating the evicted cache line to the cache line of the cache way that was selected from the group for collapse.

Clause 6: The method of clause 5, wherein: the evicted cache line comprises at least one of a non-dirty cache line or a non-most recently used (non-MRU) cache line; and the cache line of the cache way that was selected from the group for collapse comprises at least one of a dirty cache line or a MRU cache line.

Clause 7: The method of clause 1, wherein selecting at least one cache way from the group for collapse comprises selecting, for collapse, a cache way having a lowest number of dirty cache lines.

Clause 8: The method of clause 1, wherein selecting at least one cache way from the group for collapse comprises selecting multiple cache ways having lowest numbers of dirty cache lines.

Clause 9: An apparatus, comprising: a memory comprising executable instructions; and a processor configured to execute the executable instructions and cause the apparatus to perform a method in accordance with any one of Clauses 1-8.

Clause 10: An apparatus, comprising means for performing a method in accordance with any one of Clauses 1-8.

Clause 11: A non-transitory computer-readable medium comprising executable instructions that, when executed by a processor of an apparatus, cause the apparatus to perform a method in accordance with any one of Clauses 1-8.

Clause 12: A computer program product embodied on a computer-readable storage medium comprising code for performing a method in accordance with any one of Clauses 1-8.

Additional Information

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be coupled to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more computer-executable instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing a partial cache collapse procedure, comprising:
   counting, in each cache way of a group of cache ways, a number of dirty cache lines having dirty bits indicating the cache line has been modified;
   selecting, from the group, at least one cache way for collapse, based on its corresponding number of dirty cache lines; and
   performing the partial cache collapse procedure based on the at least one cache way selected from the group for collapse, wherein performing the partial cache collapse procedure comprises replacing a cache line of a cache way, from the group, that was not selected for collapse with a cache line of the cache way that was selected for collapse, wherein the replacing comprises:
   evicting the cache line of the cache way that was not selected for collapse; and
   allocating the evicted cache line to the cache line of the cache way that was selected for collapse.

2. The method of claim 1, further comprising determining one or more collapse criteria are met prior to performing the partial cache collapse procedure.

3. The method of claim 2, wherein the collapse criteria is based on at least one of a number of active cores or a request for partial cache collapse.

4. The method of claim 1, wherein:
   the evicted cache line comprises at least one of a non-dirty cache line or a non-most recently used (non-MRU) cache line; and
   the cache line of the cache way that was selected from the group for collapse comprises at least one of a dirty cache line or a MRU cache line.

5. The method of claim 1, wherein selecting at least one cache way from the group for collapse comprises selecting, for collapse, a cache way having a lowest number of dirty cache lines.

6. The method of claim 1, wherein selecting at least one cache way from the group for collapse comprises selecting multiple cache ways having lowest numbers of dirty cache lines.

7. An apparatus for performing a partial cache collapse procedure, comprising:
   a memory comprising computer-executable instructions; and
   one or more processors configured to execute the computer-executable instructions and cause the apparatus to:
      count, in each cache way of a group of cache ways, a number of dirty cache lines having dirty bits indicating the cache line has been modified;
      select, from the group, at least one cache way for collapse, based on its corresponding number of dirty cache lines; and
   perform the partial cache collapse procedure based on the at least one cache way selected from the group for collapse by replacing a cache line of a cache way, from the group, that was not selected for collapse with a cache line of the cache way that was selected for collapse, wherein the replacing comprises:
      evicting the cache line of the cache way that was not selected for collapse; and
      allocating the evicted cache line to the cache line of the cache way that was selected for collapse.

8. The apparatus of claim 7, wherein the one or more processors are further configured to cause the apparatus to determine or more collapse criteria are met prior to performing the partial cache collapse procedure.

9. The apparatus of claim 8, wherein the collapse criteria is based on at least one of a number of active cores or a request for partial cache collapse.

10. The apparatus of claim 7, wherein:
    the evicted cache line comprises at least one of a non-dirty cache line or a non-most recently used (non-MRU) cache line; and
    the cache line of the cache way that was selected from the group for collapse comprises at least one of a dirty cache line or a MRU cache line.

11. The apparatus of claim 7, wherein the one or more processors are configured to cause the apparatus to select at least one cache way from the group for collapse by selecting, for collapse, a cache way having a lowest number of dirty cache lines.

12. The apparatus of claim 7, wherein the one or more processors are configured to select at least one cache way from the group for collapse by selecting multiple cache ways having lowest numbers of dirty cache lines.

13. A non-transitory computer-readable medium comprising computer-executable instructions that, when executed by one or more processors of an apparatus, cause the apparatus to perform a partial cache collapse procedure, comprising:
    counting, in each cache way of a group of cache ways, a number of dirty cache lines having dirty bits indicating the cache line has been modified;
    selecting, from the group, at least one cache way for collapse, based on its corresponding number of dirty cache lines; and
    performing the partial cache collapse procedure based on the at least one cache way selected from the group for collapse, wherein performing the partial cache collapse procedure comprises replacing a cache line of a cache way, from the group, that was not selected for collapse with a cache line of the cache way that was selected for collapse, wherein the replacing comprises:
        evicting the cache line of the cache way that was not selected for collapse; and
        allocating the evicted cache line to the cache line of the cache way that was selected for collapse.

14. The non-transitory computer-readable medium of claim 13, wherein the partial cache collapse procedure further comprises determining one or more collapse criteria are met prior to performing the partial cache collapse procedure.

15. The non-transitory computer-readable medium of claim 14, wherein the collapse criteria is based on at least one of a number of active cores or a request for partial cache collapse.

16. The non-transitory computer-readable medium of claim 13, wherein:
    the evicted cache line comprises at least one of a non-dirty cache line or a non-most recently used (non-MRU) cache line; and
    the cache line of the cache way that was selected from the group for collapse comprises at least one of a dirty cache line or a MRU cache line.

17. The non-transitory computer-readable medium of claim 13, wherein selecting at least one cache way from the group for collapse comprises selecting, for collapse, a cache way having a lowest number of dirty cache lines.

18. The non-transitory computer-readable medium of claim 13, wherein selecting at least one cache way from the group for collapse comprises selecting multiple cache ways having lowest numbers of dirty cache lines.

19. An apparatus for performing a partial cache collapse procedure, comprising:
    means for counting, in each cache way of a group of cache ways, a number of dirty cache lines having dirty bits indicating the cache line has been modified;
    means for selecting, from the group, at least one cache way for collapse, based on its corresponding number of dirty cache lines; and
    means for performing the partial cache collapse procedure based on the at least one cache way selected from the group for collapse, wherein the means for performing the partial cache collapse procedure comprises means for replacing a cache line of a cache way, from the group, that was not selected for collapse with a cache line of the cache way that was selected for collapse, wherein the means for replacing comprises:
        means for evicting the cache line of the cache way that was not selected for collapse; and
        means for allocating the evicted cache line to the cache line of the cache way that was selected for collapse.

20. The apparatus of claim 19, further comprising means for determining one or more collapse criteria are met prior to performing the partial cache collapse procedure.

21. The apparatus of claim 20, wherein the collapse criteria is based on at least one of a number of active cores or a request for partial cache collapse.

22. The apparatus of claim 19, wherein the means for selecting, from the group, at least one cache way for collapse comprises means for selecting, for collapse, a cache way having a lowest number of dirty cache lines.

23. The apparatus of claim 19, wherein the means for selecting, from the group, at least one cache way for collapse comprises means for selecting multiple cache ways having lowest numbers of dirty cache lines.

* * * * *